(12) United States Patent
Kleven et al.

(10) Patent No.: US 6,749,254 B1
(45) Date of Patent: Jun. 15, 2004

(54) BODY PANEL ASSEMBLY

(75) Inventors: Eric Daniel Kleven, Dearborn, MI (US); Kimberly Ann Lazarz, Ypsilanti, MI (US); Matthew John Zaluzec, Canton, MI (US); Rama P Koganti, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/457,263

(22) Filed: Jun. 9, 2003

(51) Int. Cl.[7] .............................................. B62D 25/10
(52) U.S. Cl. .................. 296/191; 296/193.11; 296/198; 296/208; 296/29
(58) Field of Search ......................... 296/181.1, 181.2, 296/181.4, 191, 192, 193.11, 198, 208, 29

(56) References Cited

U.S. PATENT DOCUMENTS

| | | | | |
|---|---|---|---|---|
| 3,680,910 A | * | 8/1972 | Stanner ........................ | 296/29 |
| 5,325,632 A | * | 7/1994 | Djavairian et al. ...... | 296/146.6 |
| 6,074,506 A | * | 6/2000 | Herring et al. ............. | 156/196 |
| 2003/0188492 A1 | * | 10/2003 | Bonnett et al. ............... | 49/502 |
| 2003/0189357 A1 | * | 10/2003 | Patberg et al. ........... | 296/146.6 |

* cited by examiner

Primary Examiner—Jason Morrow
(74) Attorney, Agent, or Firm—Raymond L. Coppiellie

(57) ABSTRACT

A body panel assembly having an inner panel and an outer panel. The outer panel has a greater coefficient of thermal expansion than the inner panel. An adhesive is disposed between the inner panel and the outer panel. A portion of the outer panel is hemmed to the inner panel to join the inner and outer panels together. A scrim pad may be provided between inner and outer panels to inhibit galvanic corrosion.

20 Claims, 2 Drawing Sheets

BODY PANEL ASSEMBLY

BACKGROUND OF THE INVENTION

1. Field of the Invention

The present invention relates to a body panel assembly and a method for making a body panel assembly.

2. Background Art

Body panels are used as external surfaces on automotive and aerospace vehicles. Automotive body panels are commonly made from stamped sheet metal. These body panels are heavy, expensive, and have poor stiffness. Aerospace body panels may consist of aluminum or titanium reinforcement spars that are riveted to an outer carbon fiber layer to provide structural support. External carbon fiber surfaces are undesirable in many applications since they have rough surfaces that require extensive surface preparation prior to painting or coating. In addition, carbon fiber panels cannot be readily repaired to fix surface defects such as dents.

SUMMARY OF THE INVENTION

According to the present invention, a body panel assembly having an inner panel and an outer panel is provided. The inner panel has a first surface and a second surface opposite the first surface. The inner panel may be a non-metallic material, such as a carbon fiber reinforced polymer. The outer panel may have an internal surface and an external surface opposite the internal surface. The outer panel may be a metallic material, such as aluminum, and may have a greater coefficient of thermal expansion than the inner panel. An adhesive may be disposed between the inner panel and the outer panel to join the panels and inhibit galvanic corrosion. A portion of the outer panel may be hemmed to the inner panel to join the inner and outer panels together. The outer panel may have a first coating layer applied to the internal and external surfaces. A second coating layer may be applied to the first coating layer around the radius of the hem.

A scrim pad may be disposed between the inner panel and the outer panel along the first surface and/or an end surface to inhibit galvanic corrosion. The scrim pad may be attached to the second surface of the inner panel with an adhesive or molded in place.

According to another aspect of the invention, a duct portion may be disposed between the inner panel and the outer panel for transporting ambient air through the body panel assembly. The body panel assembly may also include a wheel well formed by a portion of the inner panel as well as fender and decklid portions formed by the outer panel.

According to another aspect of the invention, a method for making a body panel assembly for a vehicle is provided. First, an inner panel is fabricated with a first predetermined shape. Next, an outer panel is fabricated with a second predetermined shape. An adhesive may be applied to the first surface or the internal surface. The outer panel is then positioned in contact with the adhesive and the first surface of the inner panel. Finally, a portion of the outer panel is hemmed to the inner panel to provide a smooth edge.

The step of fabricating the outer panel may be conducted using a superplastic forming process and may also include coating the outer panel after it has been formed into the second predetermined shape. The step of fabricating the inner panel may include molding in a scrim pad. Alternatively, the scrim pad may be attached to the inner panel when the adhesive is applied to the inner panel.

DETAILED DESCRIPTION OF THE PREFERRED EMBODIMENT(S)

Figure 1:
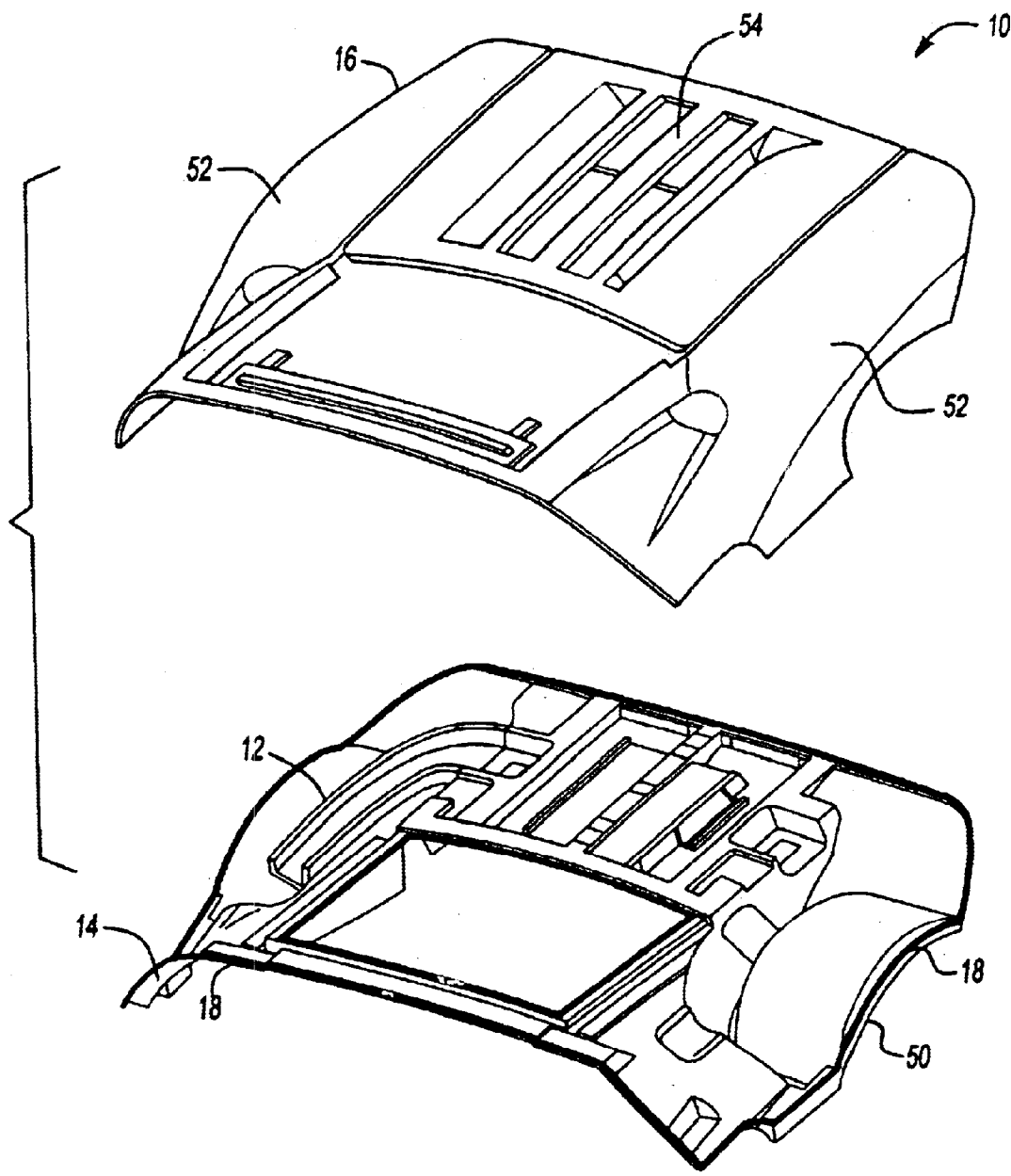
FIG. 1 shows an exploded view of a body panel assembly.

Referring to FIG. 1, a body panel assembly 10 for a vehicle is shown. In an automotive application, the body panel assembly 10 may be a body closure panel such as a tailgate, door, or engine hood. The body panel 10 may include one or more ducts 12 that allow air to pass through the body panel 10. For example, the duct may provide ambient air to an engine air inlet.

The body panel 10 includes an inner panel 14 and an outer panel 16. The inner panel 14 may be a non-metallic material, such as a carbon fiber composite, carbon fiber reinforced polymer, or a polymeric material. The inner panel 14 may be molded into a predetermined shape using conventional molding processes. In addition, the inner panel 14 may be a single piece or assembled from multiple pieces. The outer panel 16 may be a metallic material, such as aluminum, steel, or titanium, and have a greater thermal coefficient of expansion than the inner panel 14. In one embodiment, the outer panel 16 is made of aluminum that is superplastic formed into a desired shape. Alternatively, the outer panel 16 may be made from any suitable manufacturing process such as stamping. In addition, the outer panel 16 may be assembled from multiple parts that are connected to each other using adhesives, rivets, welding, or the like.

The inner panel 14 and the outer panel 16 may be joined together with an adhesive 18. The adhesive 18 permits the inner panel 14 and outer panel 16 to expand relative to each other. The adhesive 18 helps to prevent galvanic corrosion by spacing the panels apart, and also may function to block entry of contaminants between the panels. The adhesive 18 may be applied to the inner panel 14 and/or the outer panel 16. For example, as shown in FIG. 1, the adhesive 18 may be applied near the edges of the inner panel 14. Multiple adhesives may be used to accommodate environmental stresses or structural needs. Suitable adhesives include Dow Betamate™ 2096, Dow Betaseal™ 1882, and conventional silicone adhesives. Optionally, fasteners such as rivets or clips may be used to join the inner panel 14 and the outer panel 16 together.

Figure 2:
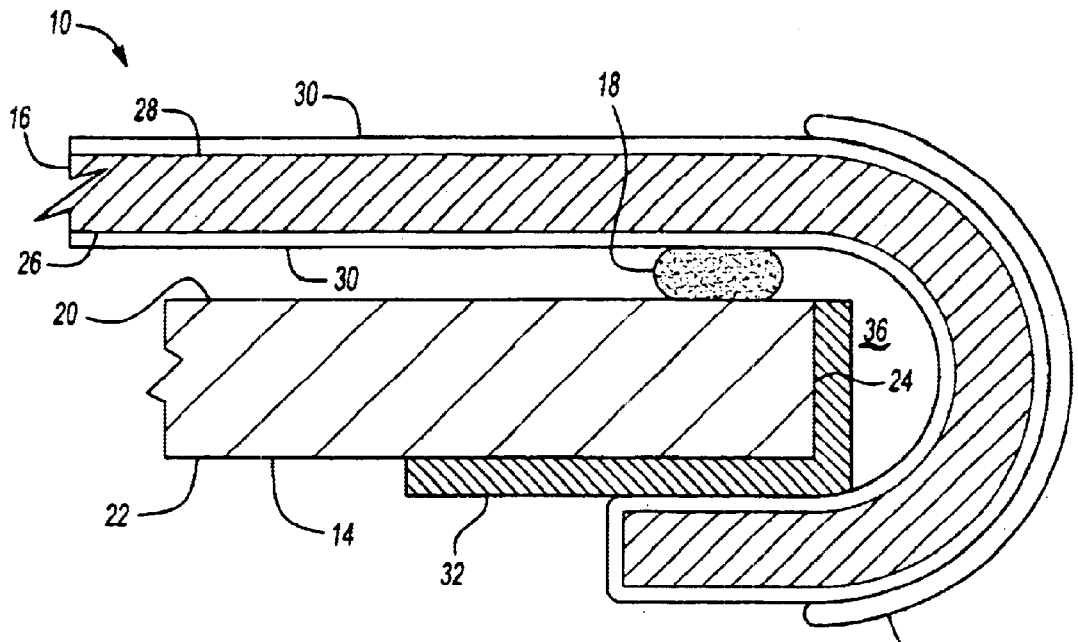
FIG. 2 shows a section view of the body panel assembly.

Referring to FIG. 2, a section view of the body panel assembly 10 is shown. The inner panel 14 has a first surface 20, a second surface 22 opposite the first surface 20, and an end surface 24 between the first surface 20 and the second surface 22.

The outer panel 16 has an internal surface 26 and an external surface 28. The internal surface 26 is adjacent to the first surface 20 when the body panel 10 is assembled. The outer panel 16 may have a first coating layer 30 applied to the internal surface 26 and/or the external surface 28. The first coating layer 30 may be applied using conventional painting or coating processes such as electrocoating.

A scrim pad 32 may be disposed on the second surface 22 to inhibit galvanic corrosion that may occur due to contact between the inner panel 14 and the outer panel 16. Optionally, the scrim pad 32 may also be disposed on the first surface 20 or the end surface 24. The scrim pad 32 may be a polymeric material, glass fiber, or any combination thereof.

The outer panel 16 is hemmed to the inner panel 14 using a conventional hemming process such as roll hemming. When the outer panel 16 is hemmed, the internal surface 26 is reversely turned to wrap around the end surface 24 of the inner panel 14. The hem allows the outer panel 16 to expand and contract with respect to the inner panel 14 and thereby accommodate the different thermal expansion characteristics of each panel. In addition, the hem creates a pocket or bight 36 between the end surface 24 and the internal surface 26. The adhesive 18 may expand or fill the bight 36 to provide additional bonding, prevent contamination, and inhibit galvanic corrosion.

Small microcracks or surface defects may occur in the first coating layer 30 during hemming. A second coating layer 34, such as a spot primer, may be applied to the coating layer 30, if necessary, about the radius of the hem.

Figure 3:
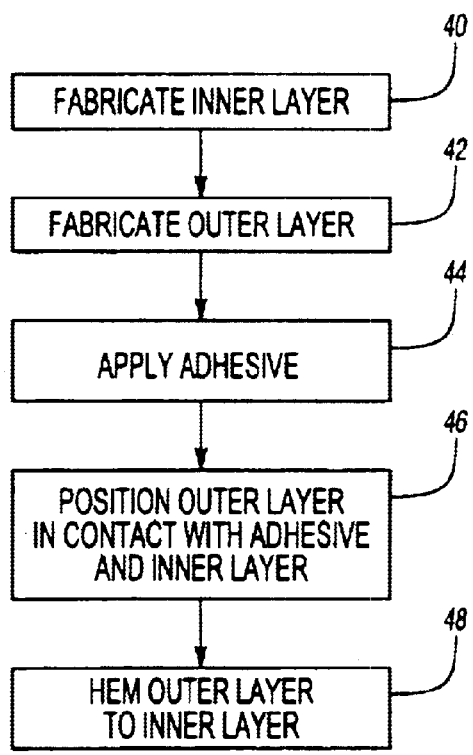
FIG. 3 shows a flowchart of a process for making the body panel assembly.

Referring to FIG. 3, a method for making a body panel assembly 10 is shown. First, at 40, an inner panel 14 is fabricated using the materials and methods previously described. In addition, the inner panel 14 may be processed in additional forming operations such as trimming, punching, drilling, and surface finishing to obtain a predetermined part configuration. Next, at 42, the outer panel 16 is fabricated using the materials and methods previously discussed. The outer panel 16 may also undergo operations such as trimming, punching, drilling, and surface finishing to obtain a desired shape.

At 44, the adhesive 18 is applied to the inner panel 14 and/or the outer panel 16. The adhesive 18 may be applied near the edges of the inner and/or outer panels or along an entire surface. Next, at 46, the outer panel 16 is positioned in contact with the adhesive 18 and the inner panel 14. At 48, portions of the outer panel 16 are hemmed to the inner panel 14 to complete the body panel assembly 10. Body panel assembly 10 has excellent stiffness and durability, while providing a paintable and repairable outer surface.

Referring back to FIG. 1, the body panel assembly 10 may include a wheel well 50 formed by the inner panel 14. A fender portion 52 located above the wheel well 50 is formed by the outer panel 16. In one embodiment, the fender portions 52 are connected by a decklid 54. The decklid may be configured to include a spoiler to enhance aerodynamics.

Depending upon engine location, the body panel assembly may be an engine hood. The engine hood may be hingedly attached to the vehicle in order to facilitate access to an engine. One skilled in the art would realize that many other possible shapes and panel arrangements can be realized.

While the best mode for carrying out the invention has been described in detail, those familiar with the art to which this invention relates will recognize various alternative designs and embodiments for practicing the invention as defined by the following claims.

What is claimed:

1. A vehicle body panel assembly comprising:
an inner panel having a first surface and a second surface opposite the first surface;
an outer panel with a greater coefficient of thermal expansion than the inner panel, the outer panel disposed adjacent to the inner panel and having an internal surface and an external surface opposite the internal surface; and
an adhesive disposed between the first surface of the inner panel and the internal surface of the outer panel for attaching the inner panel to the outer panel and inhibiting galvanic corrosion;
wherein a portion of the outer panel is hemmed to the inner panel to resist thermal expansion.

2. The body panel assembly of claim 1 wherein the inner panel is a carbon fiber composite.

3. The body panel assembly of claim 1 wherein the outer panel is aluminum.

4. The body panel assembly of claim 1 wherein the outer panel further comprises a first coating layer applied to the internal surface and the external surface.

5. The body panel assembly of claim 4 further comprising a second coating layer disposed on the first coating layer around the radius of the hem.

6. The body panel assembly of claim 1 further comprising a scrim pad disposed between the second surface of the inner panel and the internal surface of the outer panel for inhibiting galvanic corrosion.

7. The body panel assembly of claim 6 wherein the scrim pad is attached to the second surface of the inner panel.

8. The body panel assembly of claim 6 wherein the scrim pad is disposed on an end surface and the first surface of the inner panel.

9. The body panel assembly of claim 1 further comprising a duct portion disposed between the inner panel and the outer panel for transporting ambient air through the body panel assembly.

10. A vehicle body panel assembly comprising:
a non-metallic inner panel having a first surface and a second surface opposite the first surface;
a metallic outer panel disposed adjacent to the inner panel having an internal surface and an external surface opposite the internal surface; and
an adhesive disposed between the first surface of the inner panel and the internal surface of the outer panel for attaching the inner panel to the outer panel and inhibiting galvanic corrosion;
wherein the outer panel is hemmed to the inner panel to join the inner and outer panels together.

11. The vehicle body panel assembly of claim 10 wherein the outer panel further comprises a first coating layer applied to the internal surface and the external surface.

12. The vehicle body panel assembly of claim 10 wherein the inner panel is a carbon fiber reinforced polymer and the outer panel is aluminum.

13. The vehicle body panel assembly of claim 10 further comprising a scrim pad disposed between the second surface of the inner panel and the internal surface of the outer panel for inhibiting galvanic corrosion.

14. The body panel assembly of claim 10 further comprising a duct portion disposed between the inner panel and the outer panel for transporting ambient air through the body panel assembly.

15. The vehicle body panel assembly of claim 10 wherein a portion of the inner panel is a wheel well and the outer panel includes a fender and a decklid.

16. A method for making a body panel assembly for a vehicle comprising:
fabricating a carbon fiber reinforced polymer inner panel with a first predetermined shape;
fabricating a metallic outer panel with a second predetermined shape;
applying an adhesive to a first surface of the inner panel;
positioning the outer panel in contact with the adhesive and the first surface of the inner panel; and hemming the outer panel to the inner panel.

17. The method of claim 16 wherein the step of fabricating an outer panel is conducted using a superplastic forming process.

18. The method of claim 16 wherein the step of fabricating the outer panel further comprises electrocoating the outer panel after the outer panel is formed into the second predetermined shape.

19. The method of claim 16 wherein the step of fabricating the inner panel further comprises molding in a scrim layer when the inner panel is fabricated.

20. The method of claim 16 wherein the step of applying an adhesive further comprises attaching a scrim pad to the inner layer.

* * * * *